Patented Nov. 12, 1935

2,020,824

UNITED STATES PATENT OFFICE 2,020,824

PROCESS OF FERTILIZING SOIL

Cornelis B. de Bruyn, San Francisco, Calif., assignor to Shell Development Company, San Francisco, Calif., a corporation of Delaware No Drawing. Application November 26, 1934, Serial No. 754,861

6 Claims. (Cl. 47—58)

This invention relates to a fertilizing method employing the water of irrigation ditches as a distributing medium and is particularly concerned with the distribution of fixed nitrogen by means of the irrigation water.

It has long been known that nitrogen is one of the most essential chemical elements required for the growth of vegetation. This material is most lacking in arid soils so that if production from such soils is to be at all profitable nitrogen must be supplied to the vegetation.

In the past this fixed nitrogen has been supplied to the vegetation as ammonium salts or in the form of nitrates. For example, the salts have been strewn upon the ground and thereafter turned under. The salts have also been distributed by dissolving them in the irrigation waters.

The above means of distributing the required nitrogen to the soil often has the great disadvantage of introducing into the soil an acid radical in the case of some ammonium salts. For example, if ammonium sulfate is applied to some soils an undesirable acid condition in the soil may in time result. On the other hand if sodium nitrate is used an undesirable alkali condition may in time be produced.

An object of this invention is to overcome these disadvantages.

A further object is to provide a cheaper and more efficient system of supplying fixed nitrogen to the soil.

In brief my invention contemplates the supplying of ammonia gas to the water of irrigation ditches in controlled amounts.

In carrying out my invention a source of supply of gaseous ammonia such as for example a cylinder of liquid anhydrous ammonia is positioned on the bank of an irrigation ditch or near a weir box or conduit through which water for irrigation is flowing.

A pipe from the source of gaseous ammonia is led into the stream of flowing water. The ammonia gas is metered into the water by means of a suitable regulating valve. Owing to the rapid solubility of ammonia gas in water the ammonia gas does not bubble out of the water and become lost as might be expected.

Now I have found it is necessary to keep the rate of feed of ammonia low in order to prevent the burning of the vegetation. Furthermore, I have found that if too high concentrations of ammonia are produced in the irrigation water calcium carbonate is forced out of solution. This calcium carbonate or lime if precipitated in too large quantities deprives the soil of a desirable soil conditioning material, also the lime often becomes deposited in the valves in the pipe lines of an irrigation system, clogging them and rendering them inoperative. The calcium is generally present in the irrigation water as calcium bicarbonate and owing to the affinity of the ammonium ion introduced for the carbonate ion the calcium bicarbonate is reduced to calcium carbonate which is precipitated.

It will therefore be seen that the amount of ammonia which can be added to the irrigation water varies with the mineral content of the water.

In some cases the water may be slightly acidic so that some of the ammonia introduced will neutralize this acidity and the ammonia will become chemically bound thereby.

According to my invention the ammonia gas added should not exceed an amount which will produce a concentration of ammonia in the water in excess of 300 parts per million.

When a very hard irrigation water is used for example, water containing a calcium bicarbonate concentration of 445 parts or more per million, I recommend that the ammonia flow be so controlled that the concentration of ammonia produced in the water is less than about 70 parts per million.

Among the advantages of my system of supplying nitrogen to the soil over the usual practice of using ammonium sulfate comparative tests have shown the following:

The amount of insoluble calcium, magnesium and potassium salts present in the soil which is rendered soluble by the addition of ammonia in concentration below 300 parts per million of water is less than the amount rendered soluble by the addition of an amount of ammonium sulfate containing the same nitrogen equivalent.

The amount of calcium, magnesium and potassium rendered soluble by the ammonia introduced is more in line with vegetation requirements than that rendered soluble by the addition of the ammonium sulfate. Phosphoric acid is released from the soil more rapidly with the use of ammonia. This more rapid rate of phosphoric acid availability is also more desirable. The amount released by the ammonia considerably prolongs the time before it is necessary to add phosphates to the soil.

The nitrification of the ammonia proceeds at a more rapid rate than that of the ammonium sulfate so that the availability of the nitrogen to the plant is more rapid when ammonia is applied.

Other advantages of my invention result from the fact that the ammonia gas which I distribute into the irrigation ditches from cylinders containing anhydrous ammonia is 82% available nitrogen so that the freight charges are lower than where nitrogen in less concentration is used as heretofore. No bags are necessary, less storage space is required, further, the labor involved in distribution is reduced to a negligible amount for once the cylinder is located at the point of distribution it is only necessary to adjust the ammonia metering valve to the quantity desired as the vapor pressure of the anhydrous ammonia is sufficient to maintain an even discharge rate into the irrigation water until the cylinder is exhausted.

I claim as my invention:

1. The process of supplying fixed nitrogen to the soil by means of irrigation water comprising passing ammonia gas into irrigation water so as to produce a concentration of ammonia in said water which will avoid burning of vegetation, thereafter supplying said treated water to the soil.

2. The process of supplying fixed nitrogen to the soil by means of irrigation water comprising passing ammonia gas into non-acidic irrigation water so as to provide a concentration of ammonia in said water not exceeding 300 parts per million thereafter delivering the treated irrigation water to the soil.

3. The process of supplying fixed nitrogen to the soil by means of irrigation water comprising passing ammonia gas into acidic irrigation water so as to neutralize said acidity, then continuing to pass ammonia gas into said water while limiting said excess of ammonia over that required for neutralization to less than 300 parts per million of irrigation water.

4. The process of supplying fixed nitrogen to the soil by means of irrigation water containing calcium bicarbonate comprising delivering ammonia gas into said irrigation water in quantities insufficient to precipitate appreciable amounts of calcium carbonate, thereafter delivering the treated irrigation water to the soil.

5. The process of supplying fixed nitrogen to the soil by means of irrigation water containing calcium bicarbonate in amounts of 445 parts or more per million of water comprising adding ammonia gas to said irrigation water in amounts to produce a concentration of ammonia in said water of less than 70 parts per million, thereafter supplying said treated water to the soil.

6. The process of supplying fixed nitrogen to the soil by means of irrigation water comprising passing ammonia into irrigation water so as to produce an ammonia concentration in said water which will avoid burning of vegetation, thereafter supplying said treated water to the soil.

CORNELIS B. DE BRUYN.